United States Patent [19]

Boston et al.

[11] Patent Number: 4,734,564

[45] Date of Patent: Mar. 29, 1988

[54] TRANSACTION SYSTEM WITH OFF-LINE RISK ASSESSMENT

[75] Inventors: Vincent Boston, San Mateo; Elvis W. Boggan, Concord; Einar L. Asbo, Mill Valley, all of Calif.

[73] Assignee: Visa International Service Association, San Mateo, Calif.

[21] Appl. No.: 730,309

[22] Filed: May 2, 1985

[51] Int. Cl.$^4$ .............................................. G06K 5/00
[52] U.S. Cl. .................... 235/380; 235/379; 364/408; 340/825.33
[58] Field of Search ............... 235/380, 379, 381, 492, 235/382, 382.5; 340/825.33, 825.35; 364/408, 401, 406

[56] References Cited

U.S. PATENT DOCUMENTS

| | | | |
|---|---|---|---|
| 3,604,900 | 9/1971 | Kalt | 235/492 |
| 3,941,977 | 3/1976 | Voss et al. | 235/379 |
| 3,949,191 | 4/1976 | Crowther et al. | 235/380 |
| 3,982,103 | 9/1976 | Goldman | 235/380 |
| 4,011,433 | 3/1977 | Tateisi et al. | 235/381 |
| 4,091,448 | 5/1978 | Clausing | 235/379 |
| 4,114,027 | 9/1978 | Slater et al. | 340/825.33 |
| 4,197,986 | 4/1980 | Nagata | 340/825.33 |
| 4,485,300 | 11/1984 | Peirce | 235/379 |
| 4,650,976 | 3/1987 | Hiraishi | 235/379 |

Primary Examiner—Raymond F. Cardillo
Assistant Examiner—Robert A. Weinhardt
Attorney, Agent, or Firm—Limbach, Limbach & Sutton

[57] ABSTRACT

The subject invention relates to a transaction system wherein the issuer of transaction cards can regulate the type of authorization requests transmitted from the point of transaction. The system includes a plurality of transaction cards, each of which are provided with risk assessment data associated with each cardholder. The system further includes a plurality of terminals, each terminal having the ability to read the information placed on the transaction cards. In operation, the risk assessment data is compared to the transaction amount by the terminal. If the transaction is approved, the terminal will issue an automatic, off-line authorization. If the transaction does not fall within the approval range, the terminal will function to transmit the transaction information to the issuer for evaluation. The issuer can then determine whether to authorize the transaction based on its own data base.

9 Claims, 2 Drawing Figures

TRANSACTION SYSTEM WITH OFF-LINE RISK ASSESSMENT

DESCRIPTION

TECHNICAL FIELD

The subject invention relates to a transaction system wherein the issuer of a transaction card can regulate the costs of transmission of authorizaton requests. Specifically, the system permits an issuer to specify, for each cardholder, the type of transactions that may be authorized at a remote location. By this arrangement, the number of authorization requests which must be transmitted to a remote approval site is reduced, thereby reducing communications costs.

BACKGROUND OF THE INVENTION

In recent years, the use of transaction cards has substantially increased. In many cases, transaction cards are used as a substitute for cash when purchasing goods or services. These transaction cards may be in the form of credit cards where a record of the transaction is kept and later billed to the card holder. In some more recent systems, the card holder will fund an account which is debited for the amount of the transaction directly. These latter type of accounts are known as "debit cards". The banking industry has also begun utilizing transaction cards enabling common banking functions to be performed without a teller, using an automatic terminal.

As the use of these transaction cards has increased, so have losses related to fraud. Cards which have been lost or stolen are frequently used to purchase goods or services without the approval of the rightful owner. In addition, many counterfeit cards have been produced for unauthorized purchases. The industry has responded with a number of approaches designed to reduce the losses associated with such fraudulent transactions.

One of the initial approaches in the transaction card industry was to periodically print and distribute lists of lost or stolen cards. When a card is presented for a transaction, the card number is checked against this list prior to approval of the transaction. Unfortunately, this approach is time-consuming and prone to error. More importantly, because the information is distributed periodically, this system will not detect the fraudulent use of a card, prior to the time it has been reported lost, stolen or counterfeited and thereafter listed in the bulletin.

Recently, there have been developed various automatic "on-line" verification systems. In these systems, information about the cardholder and the transaction is transmitted via a commuciation link to a central control center for approval or further routing. In some cases, the central control center will be supplied with information about the cardholder and can make an approval decision. In some smaller transaction systems, the central station will be equivalent to the issuer of the card. In larger systems, where there are many card issuers, the transaction information may have to be routed from the central station to one of the outlying issuers for final approval.

When the first automatic systems were developed, the transaction information was typically entered into the approval network by the merchant, by telephoning a local receiver who would enter the data in a terminal. More recently, numerous electronic terminals have been designed that automate the process. These terminals, which are placed at the merchant locations, are designed to receive the transaction information directly.

The terminals are provided with a means for reading the transaction card. For example, many transaction cards are provided with a magnetic stripe that is encoded with information, such as the account number of the cardholder and the institution which issued the card. These terminals will have a magnetic transducer for reading this information. The terminal will transmit the data on the magnetic stripe, along with other particulars of the transaction, such as the transaction amount, into the authorization system. The approval steps will then be taken, as outlined above.

As can be appreciated, where the issuer of the transaction card is remote from the point of transaction, significant communication costs can be incurred for each approval. In addition, the approvals are time-consuming and slow down the sales process. While the electronic approval process is suitable from the standpoint of reducing fraud, it would be desirable to balance the risk of fraud with the cost of approving every transaction.

One approach for reducing the costs of communication in an approval network is disclosed in U.S. Pat. No. 4,485,300, issued Nov. 27, 1984 to Peirce. The invention therein is directed toward a large transaction card system with multiple issuers of cards and a central data communication center. Prior to the invention disclosed therein, each transaction was routed by the control center to the respective issuers for approval. In order to reduce the need for the latter step, an approach was provided wherein various parameters were supplied to the control center. These parameters would define the type of transaction which could be approved directly by the control center, rather than transmitting the authorization request to the issuer.

These parameters are based on the general type of cardholder accounts of the issuer. For example, if the issuing institution has a small group of highly credit worthy customers, it can afford to set the transaction parameters relatively high. In this case, only higher dollar amount transactions need be referred back to the issuer for approval. In contrast, where an issuer has a large number of customers that represent high risk, the parameters would be set relatively low, to minimize the potential for credit and fraud losses. In the latter case, communications costs would be higher, however, these would presumably be offset by a reduction in losses. As can be seen, the issuer is able to make the decision based on its own needs.

The above described system has proved very successful in enabling an issuer to balance its communication costs with its credit and fraud losses. However, the latter approach still requires communciation of the transaction parameters, from the merchant, to the central control station where the decision-making process is carried out. In addition, the parameters supplied to the data control center are based on a general evaluation of the cardholders of the issuer. Stated differently, these parameters are not keyed to the credit worthiness of each individual cardholder, but only represent an overall evaluation.

Based on the above, it would be desirable to provide a system where various transactions can be approved at the site of the transaction without incurring any communication costs. The decision should be under the control of the issuer and preferably based upon the credit worthiness of each individual cardholder.

Accordingly, it is an object of the subject invention to provide a new and improved system wherein the issuer can regulate the type of authorization requests, transmitted from the point of transaction.

It is another object of the subject invention to provide a new and improved system wherein an approval of a transaction can be generated off-line, at a remote terminal, based on criteria supplied by the issuer of the transaction card.

It is a further object of the subject invention to provide a new and improved system wherein issuers of cards can encode information on a transaction card to permit the evaluation of each transaction at a remote terminal.

It is another object of the subject invention to provide an approval system where communication costs are substantially reduced.

SUMMARY OF THE INVENTION

In accordance with these and many other objects, the subject invention provides for a transaction system where the issuer of a transaction card can regulate the type of authorization requests which are transmitted from the point of transaction. In this system, a file means is generated containing cardholder information. This file is maintained at a point remote from the point of transaction, such as at the issuer location. A subset of this information can also be located at a data control center, in the manner described in the above-cited U.S. Pat. No. 4,485,300.

In accordance with the subject invention, each transaction card is provided with data identifying the cardholder as well as data representative of risk assessment information associated with that specific cardholder. The risk assessment information is intended to provide an evaluation of the potential credit worthiness or in more general terms, the potential liability associated with that cardholder. For example, if the cardholder has a history of losing his cards, a greater risk would be associated with that account. Similarly, a history of exceeding credit limits would be considered in computing the risk assessment information. In contrast, if the cardholder has a high credit limit and no history of past difficulties, the risk assessment information would be designed to reflect that status.

This risk assessment information can be encoded onto the magnetic stripe of the transaction card. The information can be cryptographically encoded so that it cannot be read by unauthorized users. As can be appreciated, transaction cards are being developed which do not utilize a magnetic stripe to store cardholder information. For example, various "smart cards" have been developed where the information is held in a computer memory in a card. The subject invention is intended to cover these types of transaction cards and any others where the risk assessment information, which is supplied by the issuer, is placed on the card in a manner to be readable by the transaction terminal.

The subject invention further includes a terminal which is located at the point of transaction and, as stated above, includes a means for reading the data carried on the transaction card. The terminal includes a processor means for evaluating the transaction based on the risk assessment information carried on the card. If the particular transaction falls within the parameters set by the issuer, the terminal itself can issue an approval.

If, however, the transaction falls without the bounds set by the issuer, the authorization request will then be sent on to the communication network for approval at a site remote from the transaction. As discussed above, this approval may take place at a control center or at the issuer of the transaction card.

In the preferred embodiment of the subject invention, each transaction terminal will be provided with a transaction dollar limit. In this embodiment, the risk assessment information carried on the card will take the form of a multiplier to be used in evaluating the transaction. Specifically, the multiplier on the card will be used to modify the dollar limit in the terminal, to arrive at an amount, above which the transaction would be transmitted for approval.

Further objects and advantages of the subject invention will become apparent from the following detailed description taken in conjunction with the drawings in which:

DETAILED DESCRIPTION OF THE PREFERRED EMBODIMENTS

Figure 1:
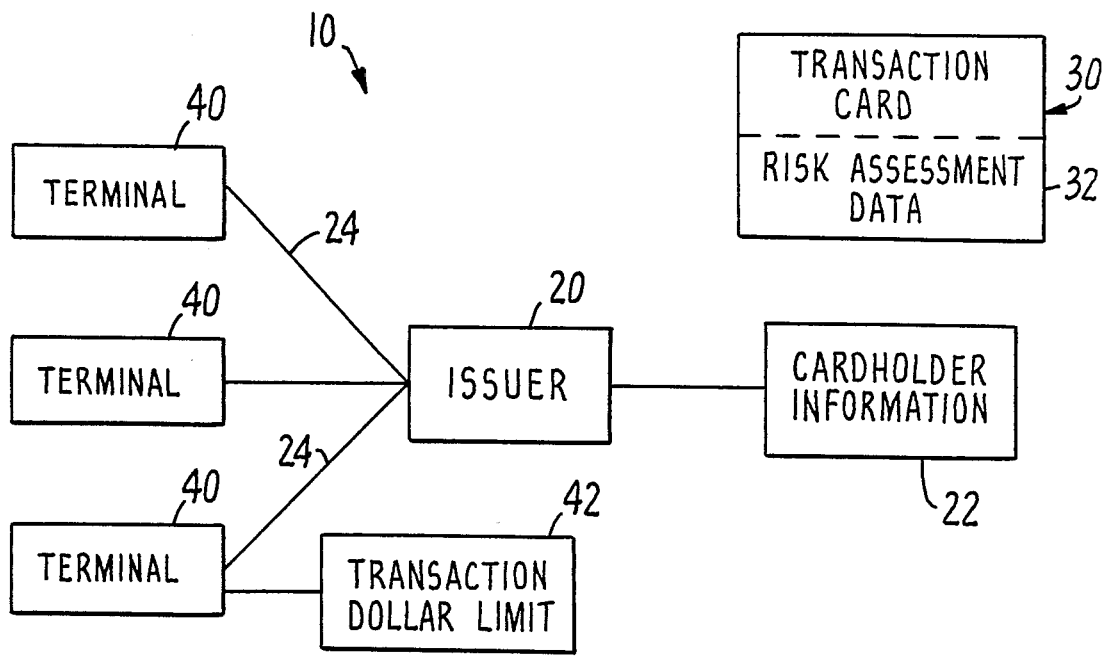
FIG. 1 is a block diagram illustrating the new and improved transaction system of the subject invention.

Turning now to FIG. 1, there is illustrated, in block form, the basic elements of the transaction system 10 of the subject invention. In this system, an organization, denoted as the "issuer" 20, distributes transaction cards 30 to a number of customers. The issuer 20 may be a bank or other financial institution. Often, the issuer will collect information from the cardholder to make an evaluation and assign a credit limit to the cardholder. This credit limit, along with associated cardholder identification information is stored in a memory 22 located at the issuer. This information can be used to determine whether a particular transaction should be approved.

There are a number of different types of transaction cards now in use, but by far the most prevalent in the United States is a plastic card having raised embossments thereon. In addition, the card is provided with a magnetic stripe which can be encoded with various account information. The parameters for these cards have been standardized. For example, the dimensions of the card are specified in ISO Document ISO/TC97/SC17/WG4-N95. The format for an encoded magnetic stripe is also standardized and can be found in ISO Standards 3554 and 4909.

The type of card and the method of assigning data thereto is not critical to the subject invention. For example, it is possible to utilize the newer type of smart cards wherein information related to the cardholder is stored in an internal memory, rather than on an magnetic stripe. In the subject invention, it is only necessary that transaction cards be capable of carrying data representative of the risk assessment associated with the cardholder.

In the basic embodiment of the subject invention, the issuer is connected via communication lines 24 to a plurality of transaction terminals 40. The terminals 40 are located at the point of the transaction. These transaction terminals are typically located at merchant locations where sales or services are being sought. However, they may also be available in banks or airports, where cash or traveller's checks are being dispensed.

The transaction terminal 40 of the subject invention has many elements similar to the automatic transaction terminals presently available. More specifically, the present point-of-transaction terminals have a means for reading the information encoded on the cards. Typically, the means includes a transducer for reading the information encoded on the magnetic stripe. Alternatively, the terminal could have contacts for interfacing with the mechanical contacts of a smart card. The terminal will also have a processor for controlling operation such as basic formating steps, dialing and transmission of the information to the issuer. Typically, the terminal will also have a key pad input for receiving additional information relating to the transaction, such as the transaction amount.

In accordance with the subject invention, the processor in the terminal will be programmed to provide a comparison function for evaluating the transaction based upon risk assessment information placed on the card. A preferred embodiment of this comparison function will be discussed below. A terminal having suitable electronics to perform all of the functions disclosed herein is manufactured by INTERNATIONAL VERIFACT, INC., Terminus Model. The latter terminal, which operates with an Intel 80C31 microprocessor, is designed to perform many transaction functions. This terminal could be readily modified to perform the functions disclosed herein by adding software instructions. The terminal may also be adjusted to read information encoded on a different track of the magnetic stripe where the risk assessment information can be placed. Additional hardware can be supplied to permit the detection of various secure card properties such as Watermark Magnetics, if other security features are desired.

In operation of the prior art system outlined above, a cardholder would present his card 30 to a merchant. The merchant would run the card through the terminal enabling the terminal to read the information on the card. The merchant would then enter the transaction amount and this information would then be transmitted along communications line 24 to the issuer. The issuer would compare the information sent by the terminal with the cardholder information stored in memory 22. If the evaluation was favorable, an approval code would be sent back to the merchant, who would complete the transaction. If the evaluation was unfavorable, the transaction would be declined. As can be appreciated, this approach was time-consuming and required significant communication costs.

In the prior art, some of the communication costs were reduced by providing a minimum or floor limit in the terminals. More specifically, the terminal could be programmed in a simple manner to automatically approve any transaction which fell below a certain dollar limit. This approach was geared to an evaluation of the merchant. Specifically, if the merchant was reputable, the type of transactions which would be automatically approved could be set at a relatively high level.

Unfortunately, this approach would not allow for any control based on an evaluation of the cardholder. Furthermore, and as discussed below, in larger systems, the dollar amount is controlled by a "merchant member," rather than the issuer. Accordingly, it would be desirable to allow the issuer of the card to control the costs of communication and to control its risk of loss.

To satisfy these objectives, each transaction card is provided with data representative of risk assessment information 32. This risk assessment data may be encoded on a magnetic stripe on the card. As noted above, this information can also be stored in a card memory or provided in any other suitable fashion.

The risk assessment data 32 is designed to define the potential liability of the cardholder. Thus, a customer having a good credit rating would be afforded a fairly high assessment value. In contrast, a card holder having a poor credit history would be supplied with a lower assessment value. Each issuer could make its decision based on the histories of its own individual cardholders.

In accordance with the subject invention, the processor in the terminal would have the capability of reading the risk assessment information on the card and comparing this information to the transaction amount. This information is compared to determine if an approval can be granted without communicating with the issuer. If the evaluation is favorable, the terminal will generate an approval "off-line." If the evaluation falls beyond the limits recorded on the card, an authorization request would be sent along communications lines 24 to the issuer 20.

In the preferred embodiment, the terminal is provided with a transaction dollar limit 42. This value will be stored in the memory of the processor of the terminal. The amount of the transaction dollar limit will be, in part, a function of the potential liability of the merchant or the particular location where the terminal is placed. In this case, the risk assessment data on the card will be defined by a multiplier which is used to increase (or reduce) the transaction dollar limit stored in the terminal.

For example, the issuer may assign a risk assessment value of "2" to the cardholder. The terminal 40, after reading the card, will multiply this value times the transaction dollar limit stored in the terminal. Thus, if the transaction dollar limit is 50 dollars, the result of the multiplication would be 100 dollars. If the amount of the transaction in progress was less than 100 dollars, an automatic approval would be generated. If the transaction amount exceeded 100 dollars, the authorization request would be routed to the issuer. The value of the multiplier can be selected to be less than one, thereby reducing the value stored in the terminal. The value of the multiplier could also be set to zero so that all transactions, for that cardholder, are sent to the issuer for authorization.

As can be appreciated, the subject system allows the issuer to have control over which requests are transmitted. In a system where the issuer is charged for such communication requests, costs can be balanced against the possibility of credit and fraud losses.

To further enhance security, it is desirable to assign a secret code or personal identification number (PIN) to each card. During a transaction, the cardholder would be required to enter his PIN, in order to secure an approval to the transaction. Such secret code systems are well-known in the prior art. Typically, the issuer will store a list of the secret numbers in memory 32 for use when the PIN is to be verified.

As can be appreciated, since the subject invention provides for remote, off-line authorization, a PIN approach must be selected which permits authorization of the PIN in the terminal. This requirement can be satisfied by placing a portion of the personal identification number (partial PIN) on the card. This partial PIN can then be compared with the full PIN entered at the terminal. Of course, if the authorization request is sent back to the issuer, the full PIN, entered by the user, can be checked with the full PIN stored at the issuer. The details of implementing one type of partial PIN validation system can be found in the Interbank Card Association PIN Manual at Page 56. If the PINs are to be encrypted, an off-line cryptographic key management system would be necessary. In the preferred embodiment of the subject invention, risk assessment information and a partial PIN are both encoded onto the card.

Figure 2:
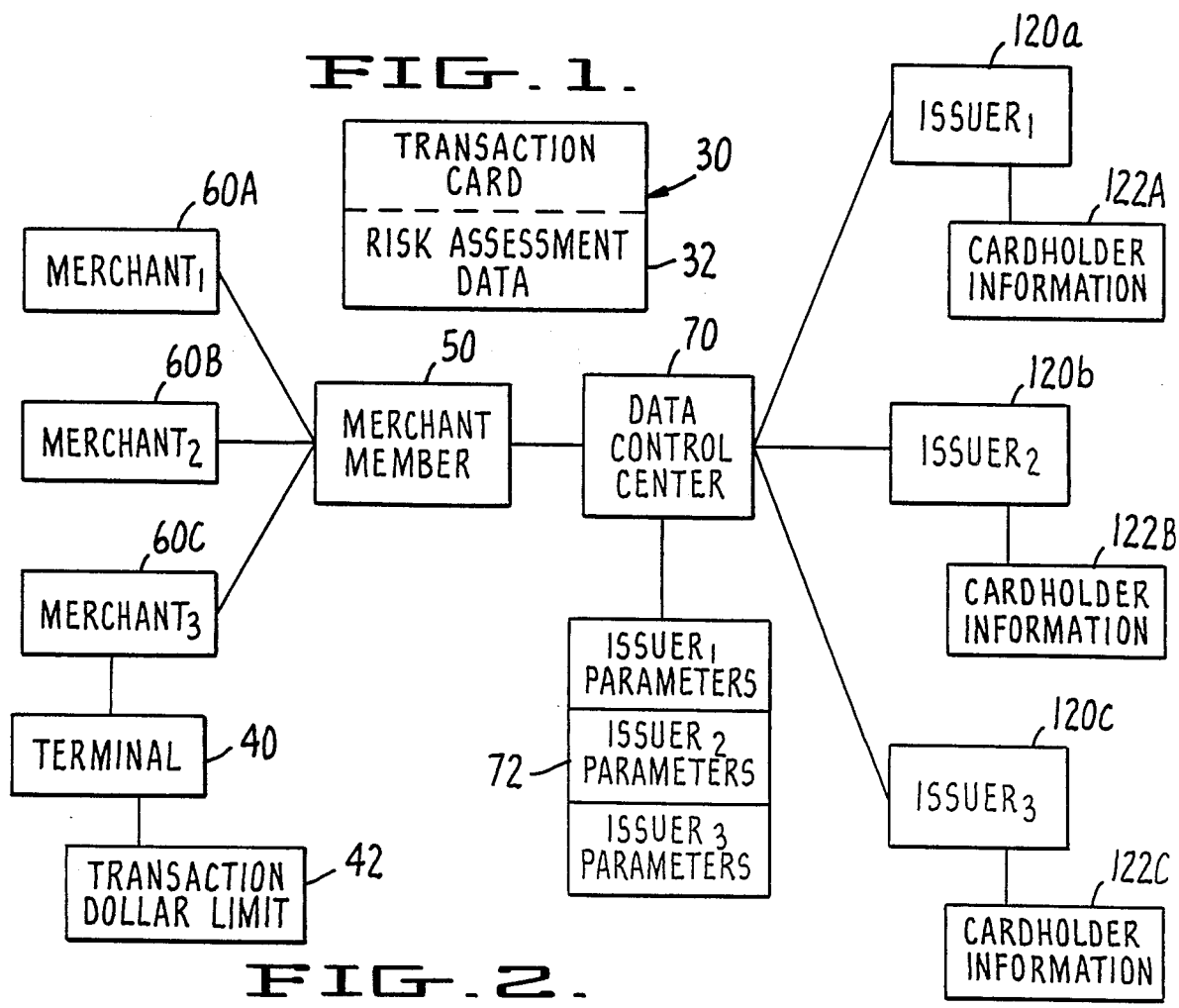
FIG. 2 is a block diagram illustrating the arrangement typically encountered in a large transaction card system.

Turning now to FIG. 2, there is illustrated a full scale transaction card system. While the subject system will find use in the simplified schematic shown in FIG. 1, its savings will be most significant in a larger system where communication costs are greatly increased. For example, the full scale system shown in FIG. 2 is implemented nationwide and, at the present time, is expanding rapidly into overseas markets.

As illustrated in FIG. 2, a large scale system will include a number of issuers 120A, B and C. Each issuer will distribute cards to its own cardholders. Thus, in this example, each issuer will maintain files 122A, B and C, respectively, for storing cardholder information. The cards of each of the issuers will include data identifying the cardholder, the issuing institution, and the risk assessment data.

In the system shown in FIG. 2, there will generally be a number of "merchant members." For clarity, only one merchant member 50 is shown. Typically, a merchant member 50 will be another financial institution which is responsible for signing up various merchants. Many issuers play the dual role of a merchant member. The illustration is shown to indicate that an issuer and the majority of its cardholders can be located in New York, while the merchant member and its associated merchants are located in California.

Each merchant member 50 would sign up or recruit a number of merchants 60A, B and C. Each merchant 60 would be provided with one or more terminals of the type discussed above with reference to FIG. 1. When the merchant 60 is signed up, the merchant member 50 would determine the potential for fraudulent transactions. Based on this evaluation, the terminal supplied to the merchant would be provided with a transaction dollar limit designed to strike a compromise between communication costs and the potential for loss. Such a transaction dollar limit can be periodically updated depending upon the performance of the merchant 60.

In the illustrated embodiment, a data control center 70 is shown. The data control center acts as a network switch for routing transaction information. In a typical prior transaction, the cardholder data and transaction amount would be entered by the merchant at the merchant location. This information would be routed to the merchant member 50. If the merchant member and the issuer of the card were identical, the transaction could be approved at that location. However, the issuer and the merchant are typically not the same and the transaction information is then supplied to the data control center 70. In this situation, the data control center will determine the identity of the issuer of the card. The transaction information is then supplied to the proper issuer 120 for comparison with its own cardholder information 122. As discussed above, the issuer will make a determination whether to approve the transaction and return the response to the merchant.

As can be appreciated, the above approach can result in extremely high communication costs. One method for reducing this cost is disclosed in U.S. Pat. No. 4,485,300. In this patent, each issuer supplies the data control center 70 with issuer parameters 72. These parameters are based on the general cardholder performance for that issuer. Thus, if the issuer has relatively credit worthy customers, the parameters can be set at high level, enabling the data control center to issue a number of automatic approvals. While this approach is successful in reducing costs, it will be apparent that the subject invention has additional advantages. Specifically, many transactions will be approved right at the merchant location, without ever having to be communicate with the data control center. Furthermore, the risk assessment information can be tailored directly to the individual cardholders.

The operation of the subject invention as shown in FIG. 2 is essentially the same as that in FIG. 1. More specifically, when a customer presents his card to the merchant, the data carried thereon is read by a terminal. The merchant will also enter the transaction amount. In the preferred embodiment, the processor will function to multiply the risk assessment value on the card times the transaction dollar amount stored in the terminal. The transaction amount will then be compared to determine if the transaction can be approved without transmission beyond the terminal. If the transaction is approved, the terminal will issue the approval directly. If the transaction is not approved, it will be sent through the system for subsequent evaluation.

In the preferred embodiment, the terminal can be programmed to add additional security features. For example, a random selector in the orocessor can be used to automatically designate certain transactions for transmission, no matter what was the result of the evaluation. In this manner, a fraudulent user who carefully selects transactions that fall below an estimated level would be periodically checked.

Another feature would be to include a geographical evaluation. More specifically, if the terminal determines that the issuer is located in a geographically close region, it can automatically route a higher percentage of those transactions thereto since communication costs are low. If, however, the terminal determines that the issuer is at a remote location, a different dollar amount can be utilized to reduce long distance communication.

In summary, there has been provided a new and improved approach for a transaction system. In this approach, the issuer of transaction cards can control communication costs based on its own assessment of its cardholders. In this system, each transaction card is provided with risk assessment information supplied by the issuer. The terminal is provided with a means for evaluating this information in comparison with the present transaction. If the evaluation is favorable, the transaction can be approved at the terminal. If the transaction is not favorable, the terminal will forward the transaction information to the issuer for approval.

While the subject invention has been defined with reference to preferred embodiments, it should be understood that various other changes and modifications could be made therein, by one skilled in the art, without varying from the scope and spirit of the subject invention as defined by the appended claims.

What is claimed is:

1. A system wherein an issuer of transaction cards can influence the type of transactions that can be approved at the point of transaction, said system comprising:

primary processor means including a file means containing cardholder information, supplied by the issuer, for evaluating a transaction;

a transaction card carrying data identifying the cardholder, said card further including nonmonetary data supplied by the issuer and representative of risk assessment information associated with the cardholder; and remote terminal means located at the point of transaction and connected to said primary processor means, said terminal means having monetary data stored therein, said terminal means having a means for reading the data carried on said card and a means for entering the amount of the transaction, said terminal means further including a remote processor means for deriving a transaction dollar limit based on the risk assessment information carried on said card and the monetary data stored in the terminal means, with said remote processor means comparing the transaction amount and the derived transaction dollar limit to determine if the transaction can be approved locally at the terminal or should be forwarded to the primary processor for further evaluation.

2. A system as recited in claim 1 wherein said transaction card includes a magnetic strips.

3. A system as recited in claim 2 wherein the risk assessment information is encoded onto said magnetic stripe.

4. A system as recited in claim 1 further including a data control center connected between said terminal means and said primary processor means.

5. A system as recited in claim 4 wherein said data control center includes a network processor means and evaluation parameters supplied by the issuer, such that the data control center will only forward the transaction information to the first processor means if the transaction does not fall within the parameters maintained at the data control center.

6. A system as recited in claim 1 wherein said nonmonetary data on the card is defined by numeric information and wherein said transaction dollar limit is derived by multiplying the numeric information with the monetary data in said terminal.

7. A system as recited in claim 1 wherein said monetary data stored in the terminal means is based on the location of said terminal means.

8. A method of operating a transaction system, said transaction system including a primary processor for evaluating transactions, a plurality of transaction cards, each card carrying data identifying the cardholder and nonmonetary data based on a risk assessment of the cardholder, said system further including a terminal located at the point of the transaction and having data entry capabilities, said terminal having monetary data stored therein, said monetary data being unrelated to the risk assessment of individual cardholders, said method comprising the steps of;

entering the cardholder identification and nonmonetary data from the card into the terminal;

entering the amount of the transaction into the terminal;

deriving a transaction dollor limit based on the nonmonetary data from the card which corresponds to the risk assessment of the cardholder and the monetary data from the terminal which is unrelated to the risk assessment of the cardholder; and comparing the amount of the transaction and the derived transaction dollor limit to determine if the transaction can be approved locally at the terminal or should be forwarded to the primary processor for further evaluation.

9. A method as recited in claim 8 wherein said nonmonetary data on the card is defined by numeric information and wherein said transaction dollar limit is derived by multiplying the numeric information with the monetary data from the terminal.

* * * * *

UNITED STATES PATENT AND TRADEMARK OFFICE
CERTIFICATE OF CORRECTION

PATENT NO. : 4,734,564

DATED : March 29, 1988

INVENTOR(S): Vincent Boston, Elvis W. Boggan and Einar L. Asbo

It is certified that error appears in the above - identified patent and that said Letters Patent is hereby corrected as shown below:

<u>In the Specification</u>

Column 8, line 35 is corrected to read as follows:

"example, a random selector in the processor can be used"

<u>In the Claims</u>

Claim 2 is corrected to read as follows:

2. A system as recited in claim 1 wherein said transaction card includes a magnetic stripe.

Claim 8 is corrected to read as follows:

Line 26, "deriving a transaction dollar limit based on the"

Line 32, "derived transaction dollar limit to determine if the"

Signed and Sealed this

Twenty-sixth Day of July, 1988

*Attest:*

DONALD J. QUIGG

*Attesting Officer*       *Commissioner of Patents and Trademarks*